United States Patent [19]

Miyazaki

[11] 4,176,341
[45] Nov. 27, 1979

[54] INFORMATION TRANSFER APPARATUS

[75] Inventor: Michio Miyazaki, Odawara, Japan

[73] Assignee: Hitachi, Ltd., Japan

[21] Appl. No.: 791,186

[22] Filed: Apr. 27, 1977

[30] Foreign Application Priority Data

May 12, 1976 [JP] Japan .................................. 51-53297

[51] Int. Cl.² .............................................. H04Q 9/00
[52] U.S. Cl. ........................... 340/147 LP; 340/147 C
[58] Field of Search ....... 340/147 LP, 147 C, 147 CN

[56] References Cited

U.S. PATENT DOCUMENTS

| | | | |
|---|---|---|---|
| 3,832,689 | 8/1974 | Means et al. | 340/147 LP |
| 3,947,818 | 3/1976 | Kobayashi et al. | 340/147 LP |
| 3,978,451 | 8/1976 | Ito et al. | 340/147 LP |
| 3,986,169 | 10/1976 | Kobayashi et al. | 340/147 R |

OTHER PUBLICATIONS

P. Favre, "Device for Fast I/O Selection", IBM Technical Disclosure Bulletin, vol. 18, No. 3, Aug. 1975 pp. 767, 768.

J. J. Duvalsaint et al., "Interrupt system Expander for Computer", IBM Technical Disclosure Bulletin, vol. 14, No. 8, Jan. 1972, p. 2525.

Primary Examiner—Donald J. Yusko
Attorney, Agent, or Firm—Craig and Antonelli

[57] ABSTRACT

An information transfer apparatus for connecting between plural channels and input/output control devices in a computer system, comprising a bundle of signal lines with which said channels are connected, said bundle of signal lines including plural signal lines provided respectively for said plural channels so as to effect the time-shared connection between said plural channels and input/output control devices therethrough.

4 Claims, 6 Drawing Figures

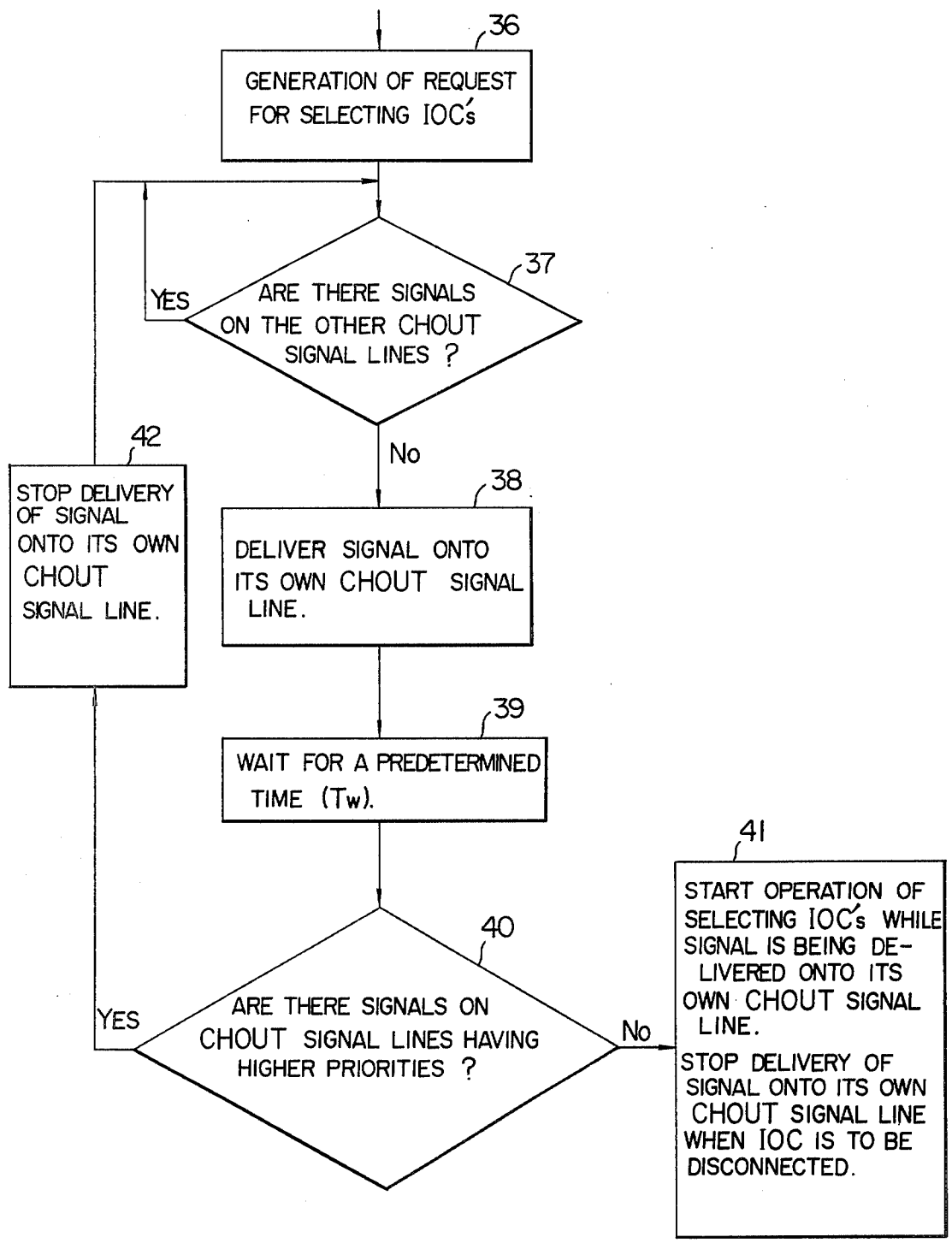

INFORMATION TRANSFER APPARATUS

BACKGROUND OF THE INVENTION

1. Field of the Invention

This invention relates to an information transfer apparatus for connecting plural channels with plural input-/output control devices.

2. Description of the Prior Art

In a computer system, when data is transferred among central processor, memory, input and output devices, one of plural input/output channels is specified or selected, depending on the sort of input/output device and desired transfer speed.

In the case of the conventional data transfer performed through the selection of one of two input/output channels by a single input/output device, the two channels are connected with two sets of transmission/-reception sections respectively through two bundles of signal lines and one of the two sets of transmission/-reception sections is connected through a switching unit with an input/output control device for controlling an associated input/output device. According to such a conventional method, the input/output control device connected with the input/output device must be provided with transmissionreception sections whose number is the same as that of the used channels. This causes a drawback of high cost.

SUMMARY OF THE INVENTION

The chief object of this invention is to provide an information transfer apparatus which can effect the time-shared connection between the channels and the input/output control devices and which has a smaller number of transmission/reception sections provided in connection with the input/output control devices.

According to this invention, there is provided an information transfer apparatus wherein a bundle of signal lines are connected in common with plural channels, the bundle of signal lines includes therein channel identification signal lines provided for the respective channels so as to indicate the priority in using the bundle of signal lines, and the time-shared connection between the plural channels and the input/output control devices is effected through the channel identification signal lines. In many cases, the above mentioned channels are provided as channel units and therefore the channels are hereafter referred to as channel units.

BRIEF DESCRIPTION OF THE DRAWINGS

FIG. 6 is a flow chart useful in explaining the operations of channel units establishing the order of using the associated signal lines.

DESCRIPTION OF THE PREFERRED EMBODIMENTS

Figure 1:
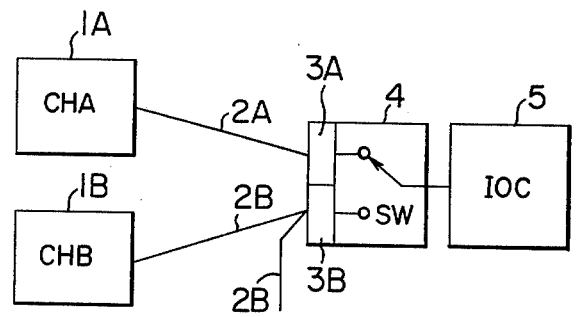
FIG. 1 schematically shows a conventional method of connecting channel units with an input/output control device.

In order to make the feature of this invention clear in comparison with the conventional apparatus, the constitution of the conventional apparatus will first be described with the aid of the attached drawings. In FIG. 1 showing a conventional information transfer apparatus using two channel units and an input/output device, reference characters 1A and 1B designate channel units A and B, i.e., CHA and CHB; 2A and 2B the associated bundles of signal lines; 3A and 3B a pair of transmitting-/receiving sections; 4 a switching unit; and 5 an input-/output control device. As shown in FIG. 1, CHA and CHB are connected respectively with the associated transmission/reception sections 3A and 3B through the associated signal line bundles 2A and 2B. Further, the signal line bundle, e.g. 2B in FIG. 1, may be connected with the transmission/reception section (not shown) of another input/output control device, as shown in FIG. 1, in addition to the predetermined transmission/reception section 3B. In accordance with the operation of the switching unit 4 for selecting one of the pair of the transmission/reception sections, one of the channel units CHA and CHB is connected with the input/output control device (also referred to as IOC for brevity) 5 to transfer desired data. With this conventional constitution, every IOC must be provided with plural transmission/reception sections whose number is the same as that of the used channel units. So, in the case of a computer system incorporating therein a multiplicity of such IOC's, there are used a great number of transmission/reception sections and the associated switching units so that the installation cost is considerable.

According to this invention, desired connection can be made between channel units and IOC's without using conventional switching units and many transmission/-reception sections, by the use of a specific design that plural channel units are connected in common with a bundle of signal lines including some signal lines for defining the order in which the bundle of signal lines are employed by each channel unit.

This invention will now be described by way of an embodiment, in which three channel units and two IOC's are used.

Figure 2:
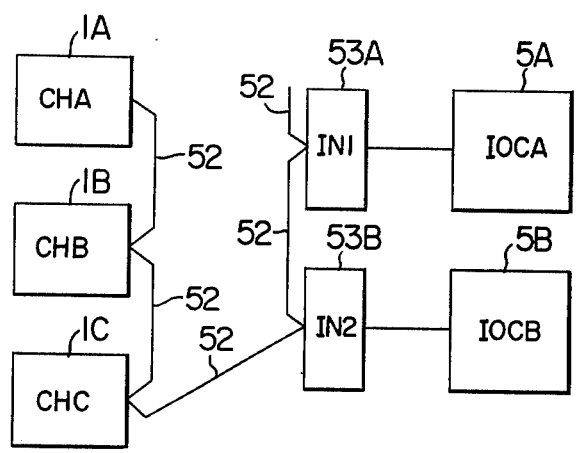
FIG. 2 schematically shows an information transfer apparatus as an embodiment of this invention.

In FIG. 2 showing the schematic structure of an embodiment of this invention, reference characters 1A, 1B and 1C indicate channel units CHA, CHB and CHC; 52 a bundle of signal lines; 53A and 53B transmission/-reception sections IN1 and IN2; and 5A and 5B input-/output control devices IOCA and IOCB. As shown in FIG. 2, the channel units 1A, 1B and 1C and the transmission/reception sections 53A and 53B are connected in common with the signal line bundle 52, and the IOCA and IOCB 5A and 5B transmit or receive data to or from one of channel units through the associated transmission/reception sections 53A and 53B. The signal line bundle 52 may be connected with the transmission/reception section (not shown) of another IOC in addition to the section 53A, as in FIG. 1.

Figure 3:
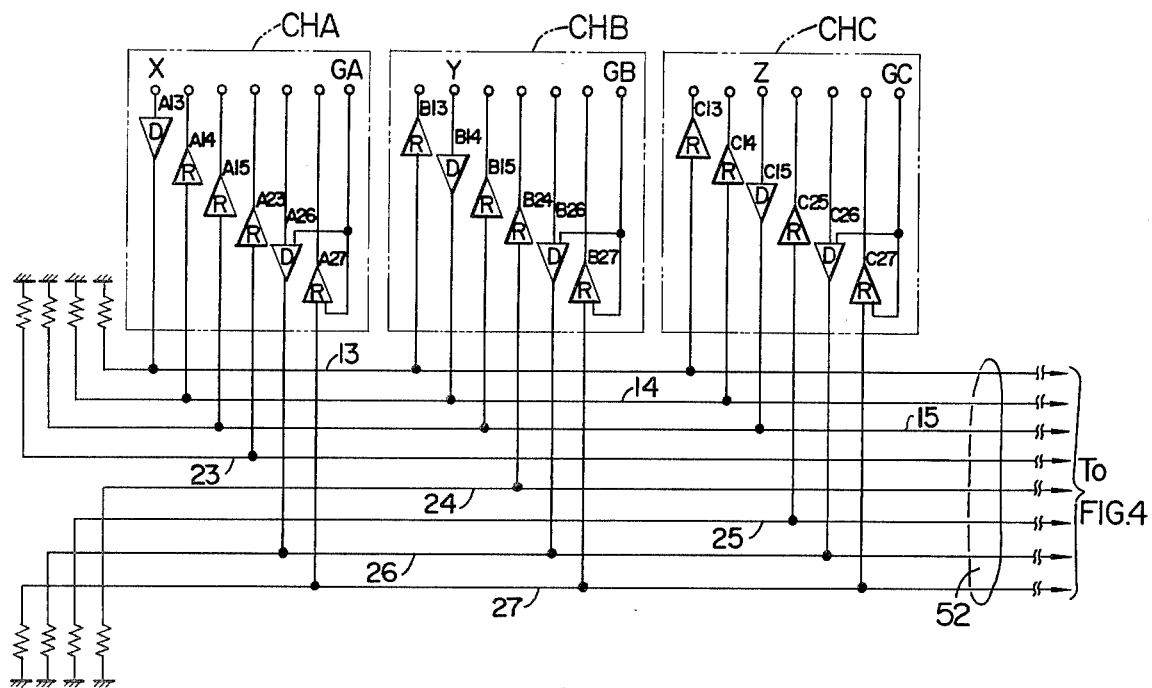
FIG. 3 shows a specific electrical connection with respect to the channel units of an information transfer apparatus according to this invention.

FIG. 3 shows specific electrical connection with respect to the channel units of an embodiment of this invention having such a structure as described above. Each of the channel units CHA, CHB and CHC has plural driver circuits and receiver circuits connected with the bundle of signal lines 52, as shown. Namely, the channel unit CHA has driver circuits A13 and A26 connected respectively with signal lines 13 and 26 and receiver circuits A14, A15, A23 and A27 connected respectively with signal lines 14, 15, 23 and 27. Similarly, the channel unit CHB has driver circuits B14 and B26 and receiver circuits B13, B15, B24 and B27 while the channel unit CHC has driver circuits C15 and C26 and receiver circuits C13, C14, C25 and C27. In the channel units CHB and CHC, the driver circuits B14, B26, C15 and C26 are connected respectively with the signal lines 14, 26, 15 and 26 while the receiver circuits B13, B15, B24, B27, C13, C14, C25 and C27 are connected respectively with the signal lines 13, 15, 24, 27, 13, 14, 25 and 27. Description will first be made of the case where the connection between the channel units and the IOC's are requested by the channel units. When the channel unit CHA, CHB or CHC requests connection, it delivers a channel-out signal (hereafter referred to briefly as CHOUT signal) X, Y or Z to the associated CHOUT signal line 13, 14 or 15 respectively through the driver circuit A13, B14 or C15, and the CHOUT signal X, Y or Z is further sent to the desired IOC. When delivering the CHOUT signal, the channel unit performs such an operation as shown in the flow chart in FIG. 6. Namely, when a request for selecting an IOC is delivered from one of the channel units, e.g. CHA, (step 36), that is, when a response concerning the start of operation of the channel unit CHA or of the IOC is obtained, the receiver circuits, e.g. A14 and A15, check whether signals are on the CHOUT signal lines corresponding to the other channel units, e.g. CHB and CHC, or not, so as to check whether the other channel units have already-occupied the signal line bundle 52 or not (step 37). When such signals are detected, which means that the other channel units are occupying the signal line bundle 52, the time at which the signals vanish is waited for. When the signals are no longer detected, the channel unit CHA delivers the CHOUT signal X onto its own CHOUT signal line, e.g. line 13 (step 38). Whether a CHOUT signal is delivered to the CHOUT signal line belonging to another channel unit just after the previous detection or not, is checked again at a constant time (for which there is a probability that the post-detection delivery of another CHOUT signal may arise) Tw after the previous detection (step 39). If there is no CHOUT signal on the associated CHOUT signal line having a higher priority (Step 40), the channel unit establishes priority in using the signal line bundle 52 and then starts operation for selecting IOC's (step 42). If there is a CHOUT signal on a CHOUT signal line having a higher priority, the channel unit CHA stops the delivery of the signal X onto the CHOUT signal line 13 (step 42), transferring the right to use the signal line bundle 52 to the channel unit employing the CHOUT signal line having a higher priority, and waits for the time at which the CHOUT signal on the line having a higher priority vanishes (step 37).

Figure 5:
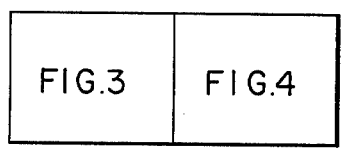
FIG. 5 shows the overall connection of the information transfer apparatus, consisting of the parts shown in FIGS. 3 and 4, according to this invention.
Figure 4:
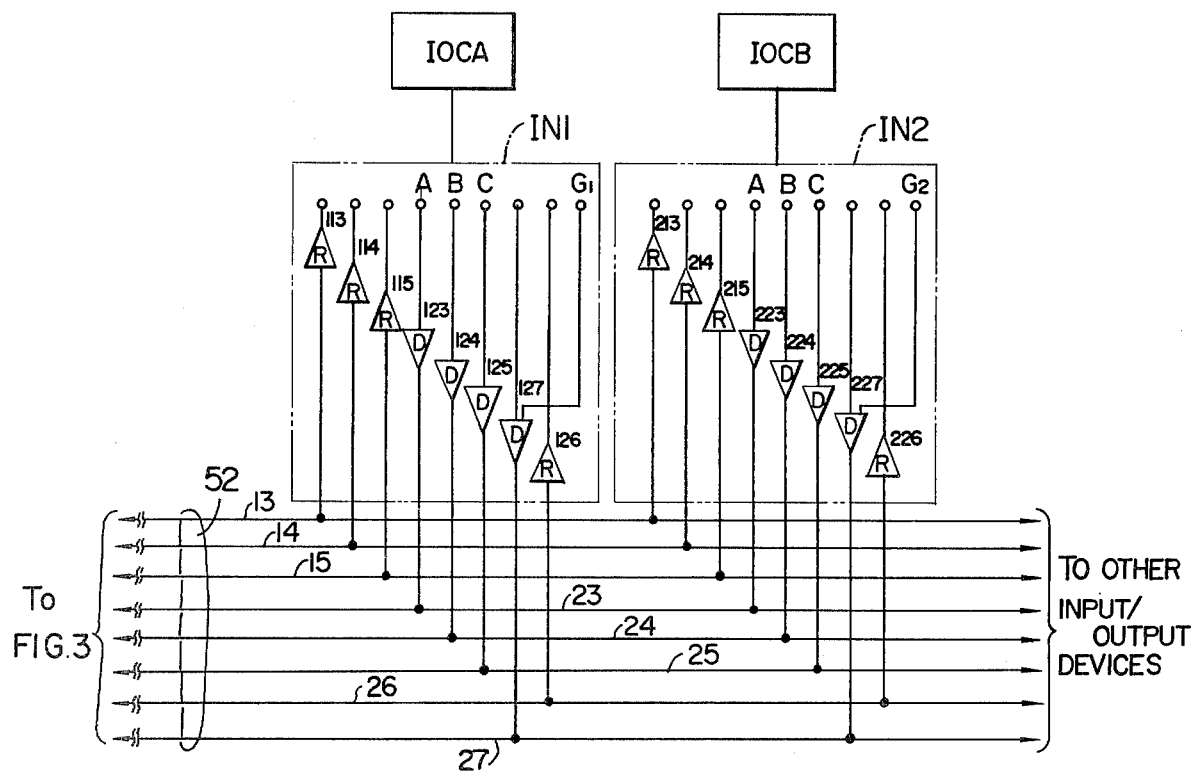
FIG. 4 shows a specific electrical connection with respect to the input/output control device of an information transfer apparatus according to this invention.

FIG. 4 shows a specific electrical connection with respect to IOC's of the embodiment of this invention, the connection with respect to the channel units of this embodiment being shown in FIG. 3. In FIG. 4, a transmission/reception section IN1 connected with the input/output control device IOCA is provided with driver circuits 123, 124, 125 and 127 connected respectively with signal lines 23, 24, 25 and 27 and receiver circuits 113, 114, 115 and 126 connected respectively with signal lines 13, 14, 15 and 26, and a transmission/reception section IN2 connected with the input/output control device IOCB is provided with driver circuits 223, 224, 225 and 227 and receiver circuits 213, 214, 215 and 226 connected respectively with signal lines 23, 24, 25, 27, 13, 14, 15 and 26. The circuits shown in FIGS. 3 and 4 are arranged as shown in FIG. 5 and the channel units are connected with the IOC's through the signal line bundle 52.

Next, the case where the IOC requests connection with one of the channel units, will be described with the aid of FIGS. 3, 4 and 5. When the IOCA (or IOCB) requests connection with the channel unit CHA, CHB or CHC, the transmission/reception section IN1 (or IN2) delivers a request signal A, B or C onto the signal lines 23, 24 or 25 through the driver circuits 123, 124 or 125 (or 223, 224 or 225), and the request signal A, B or C is sent to the receiver circuits A23, B24 or C25 of the corresponding channel unit. Namely, each channel unit checks only a request signal line associated with it. When each channel unit accepts a request for connection, the CHOUT signal line is checked in accordance with the operation described above with the aid of the flow chart shown in FIG. 6 and then the operation for selecting the IOC's ensues.

Now, the transmission and reception of data between the selected channel unit and the selected IOC will be described. By supplying gate signals GA, GB or GC to the channel unit CHA, CHB or CHC, the associated driver circuit and receiver circuit A26 and A27, B26 and B27, or C26 and C27 are activated to connect the channel unit CHA, CHB or CHC with the signal lines 26 and 27. By supplying a gate signal $G_1$ or $G_2$ to the transmission/reception section IN1 or IN2 associated respectively with the IOCA or IOCB, the driver circuit 127 or 227 is actuated to connect the transmission/reception section IN1 or IN2 with the signal line 27 for data transfer. The receiver circuits 126 and 226 are kept active, even when there is no request for connection, to receive address signals etc. As described above, data can be transferred between a channel unit and an IOC by the application of one of the gate signals GA, GB and GC or one of the gate signals $G_1$ and $G_2$.

As described above, according to this invention the dynamic channel switching as performed by the conventional apparatus having channel switches in connection with the IOC's can be effected without increasing hardware associated with the channel units and the IOC's.

The foregoing description is directed to a case of simple data transfer, but the application of this invention is by no means limited to this case. For example, this invention can be applied to the so-called reserve control. The reserve control is as follows. When an IOC receives an exclusive request to a specific device from a channel unit, the channel unit at start operation is identified by checking CHOUT signal lines. Accordingly, by storing the label of the reserving channel unit corresponding to the reserved devices controlled by the IOC's, the start operations of the other channel units to the device are rejected as errors, and only the reserving channel unit can access the reserved devices.

Moreover, in case of asynchronous interruption performed when the disk drive apparatus with disk pack mounted thereon as an input/output device becomes available, the IOC's can allocate interruptions to the respective channel units through the request signal line to inform all the channel units of the "ready" state of the input/output device so that desired asynchronous interruptions can be performed.

This invention has hitherto been described by way of preferred embodiment and it is apparent to those skilled in the art that numerous changes and modifications are possible within the scope of this invention.

I claim:

1. An information transfer apparatus for connecting between plural channels and at least one input/output control device, comprising a plurality of channel out signal lines each connected to a particular channel to be driven by that particular channel to apply a connection request signal identifying the particular channel to the at least one input/output control device and each of said channel out signal lines also being coupled in common with the remaining channels other than said particular channel to indicate to the remaining channels when the particular channel has applied a connection request signal to the at least one input/output control device.

2. An information transfer apparatus as claimed in claim 1, further comprising a plurality of request signal lines each connected from a particular channel to each of the input/output control devices to apply a connection request signal from any of the input/output control devices to said particular channel.

3. An information transfer apparatus as claimed in claim 2 wherein each channel includes individual receiver means coupled to each of the individual channel output lines of the other channels to receive connection request signals from said other channels.

4. An information transfer apparatus as claimed in claim 3, wherein each channel further includes driver means coupled to that channel's own channel out signal line to provide a connection request signal to the channel out signal line, wherein said driver unit is controlled by said receiver means to stop delivery of a connection request if a connection request signal is received by the receiver means from a channel having a higher channel priority.

* * * * *